United States Patent
Barsness et al.

(10) Patent No.: US 9,514,159 B2
(45) Date of Patent: Dec. 6, 2016

(54) DATABASE INSERTIONS IN A STREAM DATABASE ENVIRONMENT

(75) Inventors: Eric L. Barsness, Pine Island, MN (US); John M. Santosuosso, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 482 days.

(21) Appl. No.: 12/913,460

(22) Filed: Oct. 27, 2010

(65) Prior Publication Data

US 2012/0110042 A1    May 3, 2012

(51) Int. Cl.
  *G06F 7/00* (2006.01)
  *G06F 17/30* (2006.01)

(52) U.S. Cl.
  CPC ................. *G06F 17/30289* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 6,460,180 | B1 * | 10/2002 | Park et al. | 725/40 |
| 2006/0191008 | A1 * | 8/2006 | Fernando et al. | 726/23 |
| 2006/0233360 | A1 * | 10/2006 | Gammel et al. | 380/37 |
| 2007/0186004 | A1 * | 8/2007 | Ho et al. | 709/231 |
| 2009/0187656 | A1 * | 7/2009 | Bou-Ghannam et al. | 709/224 |
| 2009/0287628 | A1 * | 11/2009 | Indeck | G06N 5/025 706/47 |
| 2010/0106950 | A1 * | 4/2010 | Hou et al. | 712/233 |
| 2010/0121772 | A1 * | 5/2010 | Fitzpatrick | 705/342 |
| 2010/0191698 | A1 * | 7/2010 | Tyler | 706/54 |
| 2010/0250610 | A1 * | 9/2010 | Kanawa | 707/796 |
| 2011/0010209 | A1 * | 1/2011 | McNally | 705/7 |
| 2011/0209025 | A1 * | 8/2011 | Takahashi | 714/752 |

* cited by examiner

*Primary Examiner* — Apu M. Mofiz
*Assistant Examiner* — Thu Nga Nguyen
(74) *Attorney, Agent, or Firm* — Patterson + Sheridan, LLP

(57) ABSTRACT

Methods and systems for storing stream data in a stream application are disclosed. The stream application is composed from a plurality of processing elements executing on one or more compute nodes. The plurality of processing elements is communicatively coupled to a management system. The management system is configured to monitor and control operations of the plurality of processing elements. A trigger rule, which includes a trigger condition, is loaded on a selected processing element in the plurality of process elements. The stream data is then monitored at the first processing element to determine if the trigger condition relative to the stream data has occurred. The stream data is stored in a database when the trigger condition occurs. The stream data is stored in the database according to the trigger rule.

25 Claims, 5 Drawing Sheets

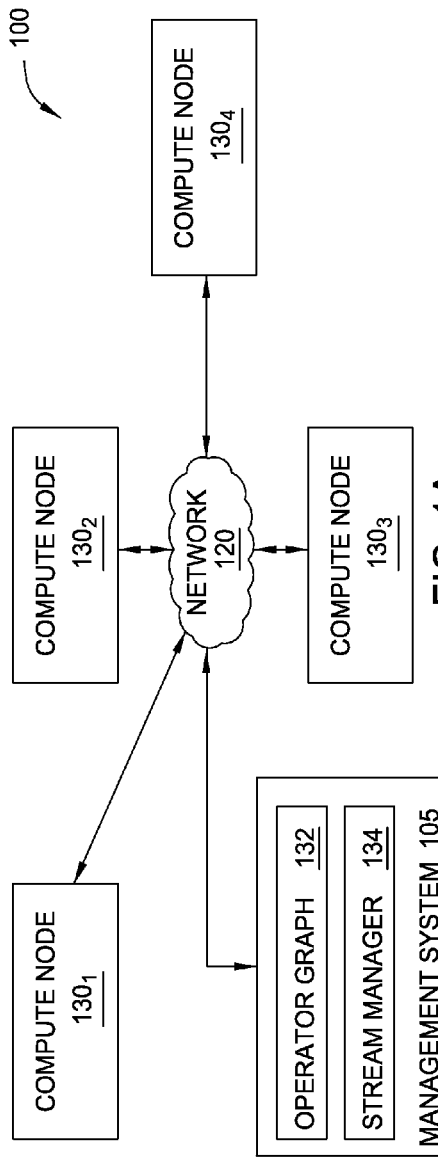
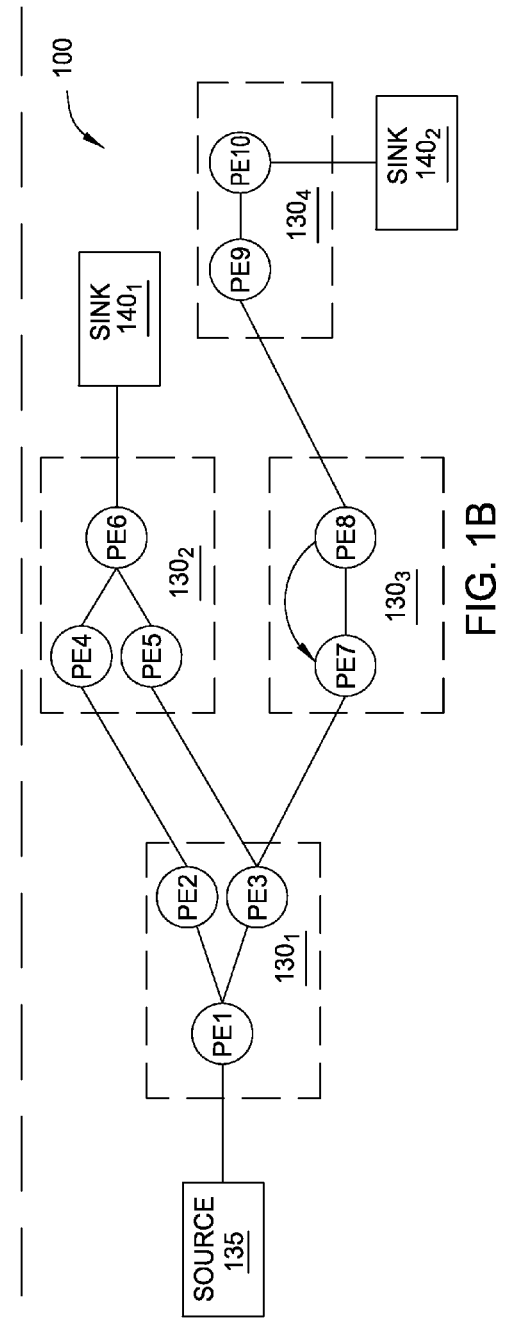
FIG. 1A
FIG. 1B

DATABASE INSERTIONS IN A STREAM DATABASE ENVIRONMENT

BACKGROUND

While computer databases have become extremely sophisticated, the computing demands placed on database systems have increased at a rapid pace. Database systems are typically configured to separate the process of storing data from accessing, manipulating or using data stored in the database. More specifically, databases use a model where data is first stored, then indexed, and then queried. However, this model cannot meet the performance requirements of some real-time applications. For example, the rate at which a database system can receive and store incoming data can limit how much data can be processed or otherwise evaluated, which, in turn, limits the utility of database applications configured to process large amounts of data in real-time.

To address this issue, stream based computing and stream based database computing is emerging as a developing technology for database systems. And products are available which allow users to create applications that process and query streaming data before it reaches a database file. With this emerging technology, users can specify processing logic to apply to inbound data records while they are "in flight," with the results available in milliseconds. Constructing an application using this type of processing has opened up a new programming paradigm that will allow for a broad variety of innovative applications, systems and processes to be developed as well as present new challenges for application programmers and database developers.

SUMMARY

Embodiments of the invention provide techniques for database insertions in a stream based application. For example, one embodiment of the invention includes a method of storing a data stream in a stream application composed from a plurality of processing elements executing on one or more compute nodes is disclosed. The method includes loading a trigger rule on a first processing element in the plurality of process elements. The trigger rule including a trigger condition. A first tuple is then received at the first processing element from the data stream. Upon determining that the first tuple received at the first processing element satisfies the trigger condition, a processing action is performed on at least one of the first tuple and the data stream. The trigger rule defines the processing action to be performed.

Another embodiment of the invention includes a computer readable storage medium containing a program which, when executed, performs an operation of storing data stream in a stream application composed from a plurality of processing elements executing on one or more compute nodes. The operation itself may generally include loading a trigger rule on a first processing element in the plurality of process elements. The trigger rule may specify a trigger condition. The operation may also include receiving a first tuple at the first processing element from the data stream. Upon determining the first tuple received at the first processing element satisfies the trigger condition, a processing action is performed on at least one of the first tuple and the data stream. The trigger rule defines the processing action to be performed.

Still another embodiment of the invention includes a system having a plurality of computer nodes, each including a processor and a memory. Each of the plurality of compute nodes is configured to execute one or more processing elements in order to process a data stream. The system may also include a management system including at least a processor and a memory. The management system and the compute nodes may be configured to perform an operation comprising, loading a trigger rule on a first processing element in the plurality of process elements. The trigger rule may include a trigger condition. The operation may also include receiving a first tuple at the first processing element from the data stream. Upon determining the first tuple received at the first processing element satisfies the trigger condition, a processing action is performed on at least one of the first tuple and the data stream. The trigger rule defines the processing action to be performed.

BRIEF DESCRIPTION OF THE DRAWINGS

So that the manner in which the above recited aspects are attained and can be understood in detail, a more particular description of embodiments of the invention, briefly summarized above, may be had by reference to the appended drawings. Note, however, that the appended drawings illustrate only typical embodiments of this invention and are therefore not to be considered limiting of its scope, for the invention may admit to other equally effective embodiments.

FIGS. 1A-1B illustrate logical diagrams of computing infrastructure configured to execute a stream application, according to one embodiment of the present invention.

DETAILED DESCRIPTION

Figure 2:
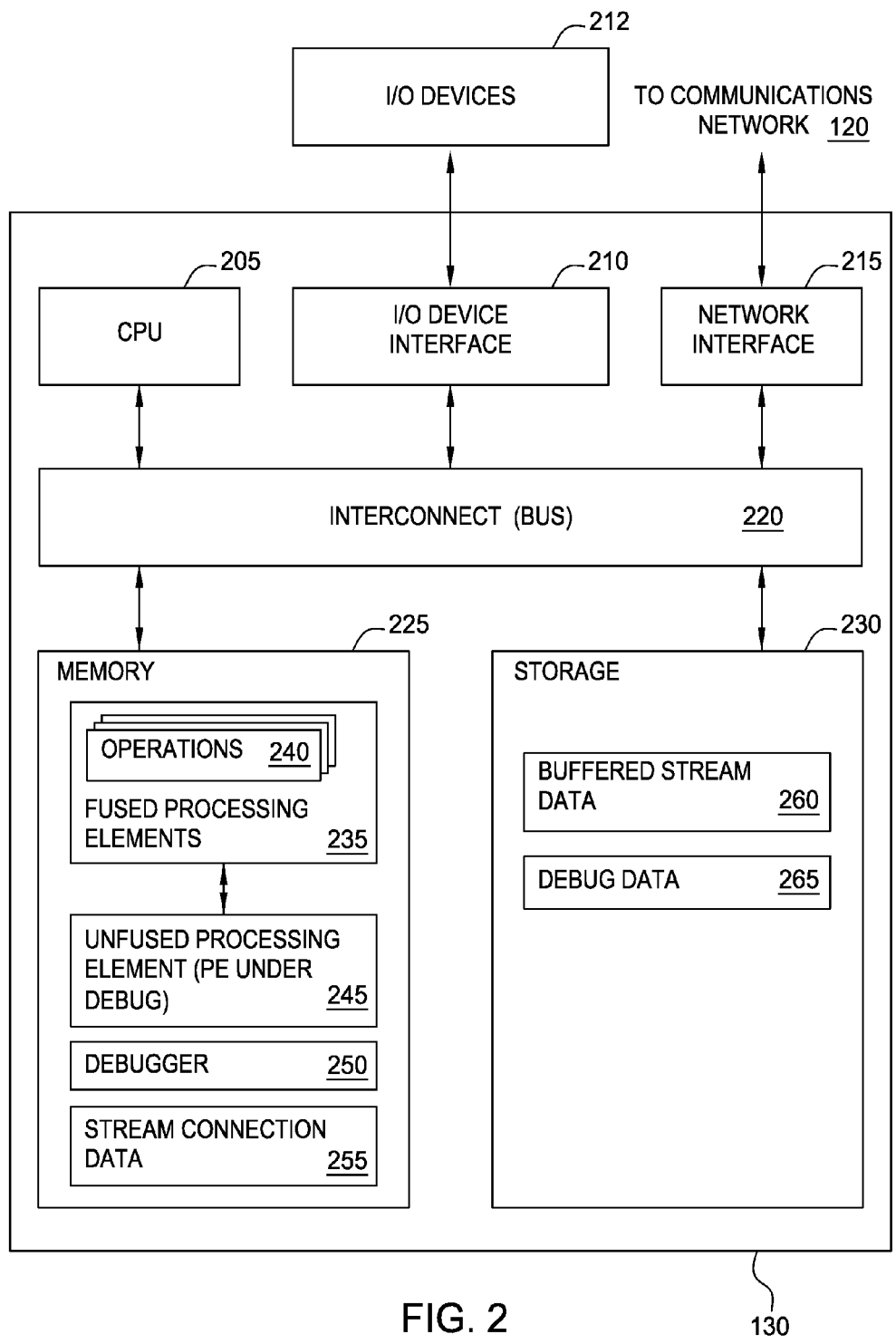
FIG. 2 is a more detailed logical view of a distributed computing node of FIG. 1, according to one embodiment of the present invention.

Typically, data collected from data sources is stored in one or more databases and then the data is retrieved by processing applications for processing. However, in scenarios where incoming data flow is huge, it becomes highly inefficient to follow the approach of first storing incoming data in a database and then retrieving the data from the database for processing. The problem becomes acute when incoming data need to be processed in real-time, because huge volumes of data cannot be stored and retrieved without losing the real-time characteristics of the data processing.

Further, in many data processing scenarios, such as real-time monitoring, generally there is no need for storing incoming data, or at least storing all incoming data. Moreover, in other data processing scenarios, data processing applications are only concerned with summaries of data rather than each individual incoming data record. Still further, some data processing scenarios require comparative analysis of incoming data with the previous values of some selected attributes. Hence, storing all incoming data is not necessary. In such scenarios, the traditional approach of data processing fails to yield desired results with regards to scalability, efficiency and real-time data processing.

To overcome the issues with the traditional approach of data processing, incoming data streams are processed without first storing incoming data stream in a data store or database. Embodiments of the present disclosure provide systems and method of processing incoming data stream without first storing (or in some cases ever storing) incoming data streams in a data store, but at the same time, selectively storing a subset of data in one or more databases, based on user defined trigger conditions.

In a stream data processing application, operators are connected to one another such that data flows from one processing element to the next (e.g., over a TCP/IP socket). Scalability is achieved by distributing an application across nodes by creating many small executable pieces of code (operators), as well as replicating processing elements on multiple nodes and load balancing among them. Processing elements (and operators) in a stream application can be fused together to form a larger processing element. Doing so allows processing elements to share a common process space, resulting in much faster communication between operators than is available using inter-process communication techniques (e.g., using a TCP/IP socket). Further, processing elements can be inserted or removed dynamically from an operator graph representing the flow of data through the stream application.

In one or more embodiments, processing elements (and operators) may be configured to process attributes of the data stream (e.g., a tuple) that flow through processing elements according to predefined configurations. Further predefined trigger rules may be loaded in one or more processing elements to enable processing elements to react to occurrences of certain events based on the state of the data stream (e.g., a rate of flow of data above or below a selected threshold, values of selected attributes in the data stream, etc.) to store a slice of the data stream in a database.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the nodes used to create a stream application may be virtual machines hosted by a cloud service provider.

FIGS. 1A-1B illustrate a computing infrastructure 100 configured to execute a stream application, according to one embodiment of the invention. As shown, the computing infrastructure 100 includes a management system 105 and a plurality of compute nodes $130_{1-4}$, each connected to a communications network 120. Also, the management system 105 includes an operator graph 132 and a stream manager 134. As described in greater detail below, the operator graph 132 represents a stream application beginning from one or more source processing elements (PEs) through to one or more sink PEs. The operator graph 132 is configurable to add or remove one or more PEs based on the data processing needs and scalability. Data elements flow into a source PE of a stream application and are processed by that PE.

Typically, processing elements receive an N-tuple of data attributes from the stream as well as emit an N-tuple of data attributes into the stream (except for a sink PE where the stream terminates). Of course, the N-tuple received by a processing element need not be the same N-tuple sent downstream. And the processing elements could be configured to receive or emit data in formats other than an N-tuple (e.g., the processing elements could exchange data marked up as XML documents). Additionally, each processing element may be configured to carry out any form of data processing functions on a received N-tuple, including, e.g., writing to database tables or performing other database operations such as data joins, splits, reads, etc., as well as performing other data analytic functions or operations. In one or more embodiments, the management system 105 also includes a user interface (not shown) to enable configuration of the operator graph 132 and the compute nodes $130_{1-4}$. The term "N-tuple" or "tuple" as used herein means a unit of data analogous to one record in a database.

The user interface may be used to load programming instructions and configurations to be executed by the compute nodes $130_{1-4}$. A database system 110 may also be included in the computing infrastructure 100 to provide persistent storage of one or more of the programming instructions, configurations and incoming data tuples. Note that even though the database system 110 is shown as a single system, in practice, the database system 110 may include one or more databases or the database system 110 may be a distributed database system. The database system 110 may be any database system that is capable of persistently storing data as well as providing interfaces for retrieval of the stored data using standard data retrieval interfaces and protocols.

The stream manager 134 may be configured to monitor a stream application running on the compute nodes $130_{1-4}$ as well as change the structure of the operator graph 132. For example, the stream manager 134 may be configured to move processing elements (PEs) from one compute node 130 to another, e.g., to manage the processing loads of the compute nodes 130 in the computing infrastructure 100. Further, the stream manager 134 may control the stream application by inserting, removing, or otherwise modifying the processing elements (or what data-tuples flow to the processing elements) running on the compute nodes $130_{1-4}$.

FIG. 1B illustrates an example operator graph that includes ten processing elements (labeled as PE1-PE10) running on the compute nodes $130_{1-4}$. While a processing element may be executed as an independently running process (with its own process ID (PID) and memory space), multiple processing elements may be fused to run as single process (with a PID and memory space). In cases where two (or more) processing elements are running independently, inter-process communication may occur using a network socket (e.g., a TCP/IP socket). However, when processes are fused together, the fused processing elements can use more rapid communication techniques for passing N-tuples (or other data) among processing elements (and operators in each processing element).

As shown, the operator graph begins at a source PE 135 (labeled as PE1) and ends at sink PEs $140_{1-2}$ (labeled as PE6 and PE10). Compute node $130_1$ includes source PE1 along with PE2 and PE3. Source PE1 emits tuples received by PE2 and PE3. For example, PE1 may split data elements received in a tuple and pass some data elements to PE2 others to PE3. Data that flows to PE2 results in tuples emitted to PE4 on compute node $130_2$. And data tuples emitted by PE4 flow to sink PE6 $140_1$. Similarly, data tuples flowing from PE3 to PE5 also reach sink PE6 $140_1$. Thus, in addition to being a sink for this example operator graph, PE6 could be configured to perform a join operation for combining tuples received from PE4 and PE5. This example operator graph also shows data tuples flowing from PE3 to PE7 on compute node 130₃, which itself shows data tuples flowing to PE8 and looping back to PE7.

Data tuples emitted from PE8 flow to PE9 on compute node 130₄, which emits tuples processed by sink PE10 140₂. Sinks 140 may be configured to perform further processing on incoming data tuples. In one or more embodiments, sinks 140 may be configured to store data tuples in the database system 110. Sinks 140 may also be configured to send the data tuples to other applications in the computing infrastructure. Further, sinks 140 may also be configured to maintain process logs and audit trail of incoming data tuples. Alternatively, depending on a particular configuration and requirements of a data processing application, sinks 140 may also be configured to dispose the data without performing any processing. In one or more embodiments, PEs may be configured to transform incoming data tuples by either adding or removing one or more data attributes before emitting outgoing data tuples to other PEs, as per the configuration of target PEs. For example, based on a pre-defined configuration, if an incoming tuple at PE1 includes the attribute "employee salary," PE1 may query the database system 110 (or other data source that includes pertinent employee data) to retrieve the last salary raise date and add this information in the corresponding outgoing tuple before emitting the outgoing tuple to PE2. It may be noted that when a tuple is bifurcated to be processed by more than one processing elements, a unique identification may be affixed to all bifurcated tuples so that the data in the bifurcated tuples may be combined or related when a need arises during further processing, retrieval or storage of information related to the original data tuple.

In one embodiment, incoming data tuples are configured to include a set of attributes and PEs are arranged in an interconnected network of processing elements to provide processing of one or more included attributes. For example, the operator graph 132 may be created based on known attribute processing characteristics of a plurality of available processing elements in the computing infrastructure 100 vis-à-vis included attributes in incoming data tuples.

Further, each processing element (e.g., PE1-PE10 in FIG. 1B) may be configured with one or more trigger conditions to enable automatic storage of one or more attributes of incoming data tuples when one or more pre-configured trigger conditions are satisfied. For example, values of data attributes may be summarized in a pre-selected time window and stored in the database 110.

For example, in an exemplary traffic monitoring application, a processing element may be configured to read the attribute named "license plate" in incoming data tuples. The processing element may further be configured to read another attribute named "Fasttrack verified" from incoming data tuples. If the processing element determines that the vehicle as identified by the value of the "license plate" attribute did not verify its "FastTrack" credentials, the processing element may either store the license plate number in the database or emit a data tuple to be processed by another processing element, which in turn would store the license plate number. This stored data then may be used by another application for further processing with regards to accessing fines. As evident, even though a huge volume of data is being streamed, not all of incoming data need to be stored in the database. Further, this example illustrates the advantages of the stream processing architecture as depicted in FIG. 1A-1B.

FIG. 2 is a more detailed view of the compute node 130 of FIGS. 1A-1B, according to one embodiment of the invention. As shown, the compute node 130 includes, without limitation, a central processing unit (CPU) 205, a network interface 215, an interconnect 220, a memory 225, and storage 230. The compute node 130 may also include an I/O devices interface 210 used to connect I/O devices 212 (e.g., keyboard, display and mouse devices) to the compute node 130. The compute node 130 may be a physical host or a virtual machine. A virtual machine provides a software abstraction of computing resources of a physical host computer. With a deployment of virtualization software, a physical host may be configured to host a plurality of virtual machines. Typically, a virtual machine runs as an independent computer. Various technologies are available to live migrate a virtual machine from one physical host to another while the virtual machine is still running, spawn more virtual machines on the fly, etc. In one embodiment, processing nodes and the management server may be hosted in a virtualized computing environment to provide well known advantages of virtualized computing infrastructure including another layer of scalability and fault tolerance.

The CPU 205 retrieves and executes programming instructions stored in the memory 225. Similarly, the CPU 205 stores and retrieves application data residing in the memory 225. The interconnect 220 is used to transmit programming instructions and application data between the CPU 205, I/O devices interface 210, storage 230, network interface 215, and memory 225. CPU 205 is included to be representative of a single CPU, multiple CPUs, a single CPU having multiple processing cores, and the like. And the memory 225 is generally included to be representative of a random access memory. Storage 230, such as a hard disk drive, solid state device (SSD), or flash memory storage drive, may store non-volatile data.

In this example, the memory 225 includes one or more processing elements (PEs) 235, a database module 250, an analytics module 255. Other processing modules may be loaded in the memory 225 to configure the processing node 130 to adapt to particular types of data processing needs. The PEs 235 includes a collection of operators 240. Each operator 240 may provide a small chunk of executable code configured to process data flowing into a processing element (e.g., PEs 235) and to emit data to other operators 240 in a PE and to other PEs in the stream application as described by the operator graph 132. In one embodiment, a processing element (PE) may include a plurality of simultaneously active operators 240, each of which may be configured to receive data traffic at a different incoming port of the PE. In another embodiment, only one of the operators 240 may be active at a given time. In this embodiment, the PE may be configured to invoke a pre-configured operator when a particular type of tuple is received or when a particular type of data processing is needed on a particular type of attribute in an incoming tuple (for example, when an operator needs to get a composite data parsed, the operator may invoke another operator that is pre-configured to provide the needed parsing). The other PEs may be on the same compute node 130 or on other compute nodes accessible over the data communications network 120. The database module 250 provides an interface to the database system 110 to enable storage and retrieval of data by operators 240 and other processing modules of a compute node 130. The database system 110 may be accessed via the communication network interface of the compute node 130 using any suitable protocols or interfaces (e.g., TCP/IP sockets, SQL, etc.). The database module 250 may also provide data manipulation functionalities such as data grouping, joins, etc. The analytics module 255 may be included in the compute node 130 to provide analytical data processing capabilities in the compute node 130. Analytical data processing may include summarizing data in harmony with the previously stored data, forecasting, comparing the streaming data within a selected time window with a previously stored data, etc. Data analytics is well known in the art, hence a further discussion is being omitted.

Buffered stream data 260 represents a storage space for data flowing into the compute node 105 from upstream processing elements (or from a data source for the stream application). For example, buffered stream data may include data tuples waiting to be processed by one of the PEs 235. Buffered stream data 260 may also store the results of data processing performed by PEs 235 that will be sent to downstream processing elements (or load shed).

Buffered data 265 represents previously stored data, which the compute node may retrieve from time to time and cache for the analytics module 255. For example, the compute node 130 may retrieve a part of the previously stored data within a particular time window, from the database system 110 and provide this retrieved data to the analytics module 255 to improve analytical efficiency. The data in the buffered data 265 may be refreshed at selected intervals. In one embodiment, a compute node 130 may be configured to disable such pre-fetching of previously stored data. In this example, if the previously stored data is needed for data processing, the analytics module 255 (or any other module in the compute node 130 that may need such data) is configured to retrieve the previously stored data directly from the database system 110, as needed. In some embodiments, the buffered data 265 may not be included in the process nodes 130 depending upon the data processing requirements.

The storage 230 may also include trigger rules 270, which when executed in a processing element, may be used for automatically storing a selected slice of data in the database system 110. The trigger rules 270 may be stored in XML format or in any other data format so long as a processing element 235 can parse the data format. The trigger rules 270 may also be stored in the form of programming instructions, which can be loaded and executed by processing elements 235. In another embodiment, the operators 240 in a processing element 235 may include a pre-configured operator to handle a particular pre-configured trigger condition and to execute one or more trigger rules 270 based on the occurrence of the particular trigger condition.

In one example, a trigger rule 270 code or configuration may include all or a part of the following information (simplified representation for better understanding):

TABLE 1

Trigger rule name or id
One or more trigger condition (e.g., rate of incoming tuples above a threshold )
Operate on tuples having an attribute <attribute>
Store attributes <att1> and <att2> from incoming tuples when the trigger condition occurs
Transform <att1> from String to Integer
Store timestamp
Store: <directly to the database> or <send data to the management system 105>

Note that a person skilled in the art would realize that a trigger rule configuration (as shown in Table 1) may include other information or programming instructions as needed for processing a particular type of streaming data, without departing from the scope of the present invention. Through appropriate programming instructions, the processing elements 235 or the operators 240 may be configured to operate according to a configuration of a trigger rule 270.

In one embodiment, as noted above, each tuple in a data stream includes a set of attributes. These attributes may be mapped directly to a database object (e.g., a table, db file, stored procedure, etc.). Similarly, a subset of attributes may be correlated to a database object. In one embodiment, data tuples in the data stream that flows through processing elements are not automatically stored in the database system 110 unless a preconfigured trigger event occurs, according to a trigger rule 270. The trigger events may be configured based on status of data streams and other events such as attributes received within a particular time window, etc. Other trigger events may include configuring rules based on tuple rates, data thresholds, status of data in the database 110, etc.

Further, depending on a particular configuration, when a trigger condition occurs, either individual data attributes or some transformation of data, such as summaries, averages, medians, etc. within a preselected time window, may be stored. Moreover, prior to storing attributes of data streams, the attributes may be transformed (e.g., integer values to string values, character to timestamp, etc.). Additional data such as timestamp, locale, tracking data, etc. may be added prior to storing the attributes. Moreover, the data being stored may be split across multiple database tables or files. A trigger rule 270 may define whether all attributes of a data tuple or a subset needs to be stored in the database system 110.

In one example, based on the previously stored summaries of data, if a processing element determines that the rate of incoming data tuples (for example, a number of vehicles passing through a particular monitoring point) is slower below a configured threshold, the processing element may automatically store a slice or a summary of incoming data tuples because this event could be an indication of abnormal traffic conditions. Many other such trigger events are possible based on particular characteristics of a stream application.

Still further, each of the trigger rules 270 may be configured to include monitoring the data stream for the occurrence of trigger conditions at one processing element or more than one processing elements or all processing elements (e.g., PE1-PE10 in FIG. 1B) in a streaming application. For example, a trigger rule 270 may be configured based on the tuple rate exceeding a selected threshold in a particular processing element 235. Alternatively, a trigger rule 270 may be configured to be executed when the tuple rate exceeds a selected threshold in all processing elements (e.g., PE1-PE10 in FIG. 1B) either substantially simultaneously or within a selected time window. A person skilled in the art would realize that many other trigger rule configurations are possible, within the scope of the present invention, as needed to store data in the database system 110 by a particular type of streaming application.

In one embodiment, the trigger rules 270 may also be configured based on occurrences of some events in the database system. For example, the trigger rules 270 may be configured based on the sum of a column in a table that is related to a streaming application. In one embodiment, the management system 105 is configured to monitor the database system 110 to determine occurrence of a pre-configured trigger condition in the database system 110 (e.g., the sum of a column exceeding a selected threshold). In one embodiment, when the management system 105 detects occurrence of a trigger condition in the database system 110, the management system 105 broadcast the event to all processing elements. If a processing element has a trigger rule configured based on the announced occurrence of the event in the database system 110, the trigger rule is executed as per a pre-configured scheme.

It should be noted that similar to the monitoring of the database system 110, the management system 105 may be configured to monitor any external system, internal system or data source. In other embodiment, a processing element may also be configured to monitor any external system, internal system or data source for occurrences of pre-configured trigger conditions.

Figure 3:
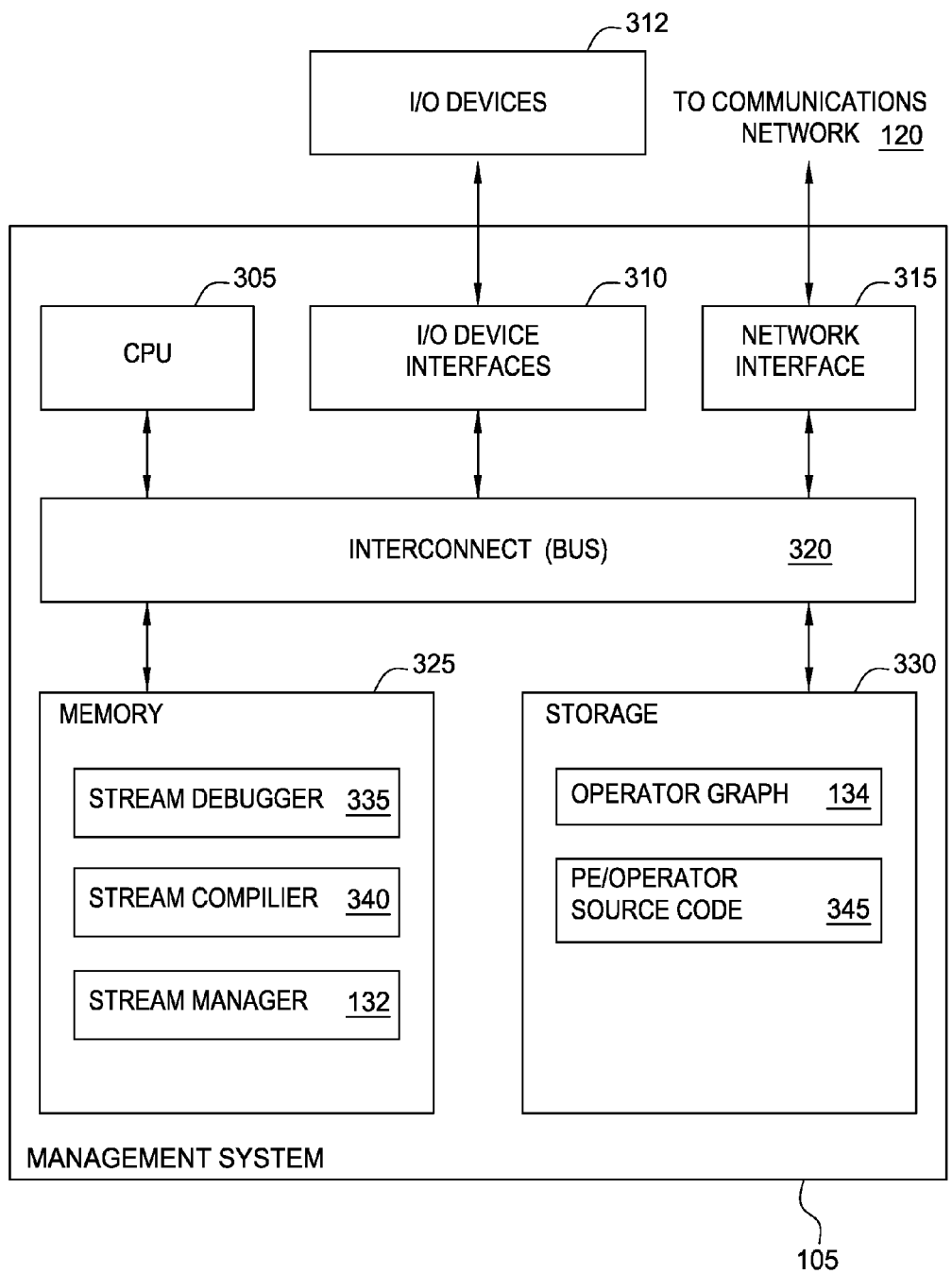
FIG. 3 is a more detailed logical view of a management computing system in a stream application, according to one embodiment of the present invention.

FIG. 3 is a more detailed view of the management system 105 of FIG. 1, according to one embodiment of the invention. As shown, management system 105 includes, without limitation, a central processing unit (CPU) 305, a network interface 315, an interconnect 320, a memory 325, and storage 330. The client system 130 may also include an I/O device interface 310 connecting I/O devices 312 (e.g., keyboard, display and mouse devices) to the management system 105.

Like CPU 205 of FIG. 2, CPU 305 is configured to retrieve and execute programming instructions stored in the memory 325 and storage 330. Similarly, the CPU 305 is configured to store and retrieve application data residing in the memory 325 and storage 330. The interconnect 320 is configured to move data, such as programming instructions and application data, between the CPU 305, I/O devices interface 310, storage unit 330, network interface 305, and memory 325. Like CPU 205, CPU 305 is included to be representative of a single CPU, multiple CPUs, a single CPU having multiple processing cores, and the like. Memory 325 is generally included to be representative of a random access memory. The network interface 315 is configured to transmit data via the communications network 120. Although shown as a single unit, the storage 330 may be a combination of fixed and/or removable storage devices, such as fixed disc drives, removable memory cards, optical storage, SSD or flash memory devices, network attached storage (NAS), or connections to storage area-network (SAN) devices.

As shown, the memory 325 stores a node manager 340 and a stream manager 134. The storage 330 also includes the operator graph 132. The node manager 340 may be used to configure the compute nodes 130 with respect to loading programming instructions and related configurations, assigning or reassigning processing elements on different compute nodes 130, etc. The node manager 340 may also be used for setting up one or more processing elements and operators in the compute nodes 130. The processing elements 235 and operators 240 setup may include configuring each processing element and operator to process particular type of streaming data attributes, accept the streaming data in a particular format and emit the streaming data in another particular format, which may be the same or different from the data format of incoming tuples.

The storage 330 may also include a trigger rule store 350. The trigger rule store 350 may be used for storing the trigger rules 270. In one embodiment, the trigger rule store 350 provides a centralized place for creating, editing, configuring and storing the trigger rules 270. The trigger rules 270 may be deployed in the compute nodes 130 from the trigger rule store 350 as needed according to a stream application. The trigger rule store 350 for storing and managing the triggers rules 270 centrally is advantageous because such centralized storage enables reconfiguration and removal of one or processing elements (or compute nodes 130) from without losing the deployed trigger rules 270. In one embodiment, when a deployed trigger rule 270 needs to be modified, the same trigger rule 270 (each trigger rule 270 may be given a unique name or identification) in the trigger rule store 350 may be modified and redeployed from the trigger rule store 350. In one embodiment, the trigger rule store 350 is configured to keep track of all deployed trigger rules 270.

Further, a centralized management and monitoring of the trigger rules 270 is advantageous to enable monitoring of trigger conditions at more than one processing elements. For example, a composite trigger rule 270 may be created to monitor the occurrence of one or more trigger conditions on two processing elements (or two compute nodes 130). In this example, the composite trigger rule 270 is configured to save some attributed of incoming tuples only when one or more pre-configured conditions occur at both processing elements (or compute nodes 130). In this example, each of the two processing elements may send the data to be saved (see Table 1) in the database system 110 to the management system 105. In this example, the management system 105 is configured to be aware of the deployed trigger rule 270 and accordingly the management system 105 will only store the data in the database system 110 only when both processing elements send the data to be saved within a selected time window. That is, in this composite trigger rule scenarios, some parts of incoming tuples can be saved in the database system 110 only when one or more trigger conditions occur at all processing elements on which the trigger rule in question is deployed. In this example, the management system 105 may combine the data received from the processing elements accordingly to a setting in the deployed trigger rule 270, before saving the data in the database system 110. Of course, since the trigger rules 270 are configurable to suit particular needs of a data processing elements, a trigger rule 270 may be configured to instruct either the processing element on which the trigger rule 270 is deployed or the management system 105, or both to act in any pre-configured fashion.

The stream manager 134 may be used to monitor the data stream as it flows through the processing elements in a stream application. The stream manager 134 may also maintain logging and audit trails of the streaming data as the streaming data is processed by the compute nodes 130. In one embodiment, the stream manager 134 may be used to instruct processing elements to store a particular type of data in the database system 110 based on occurrences of an event. The storage 330 includes storage for operator graph 132. As noted above, the operator graph 132 maintains the connectivity configuration of a plurality of compute nodes and processing elements in a streaming application. In one embodiment, the processing element and operator source code 345 may also be stored in the storage 330. The processing element and operator source code 345 is loaded to setup the processing elements 235 and the operators 240 in the compute nodes 130.

As noted above, the management system 105 may include a user interface to enable configuration and storage of trigger rules and trigger conditions. The user interface may also be used for building the operator graph 132 (that is, to configure and network the processing elements to suit a particular streaming application). Moreover, as noted above, the user interface may also be used to load programming instructions in each of the processing elements in the operator graph 132.

Figure 4:
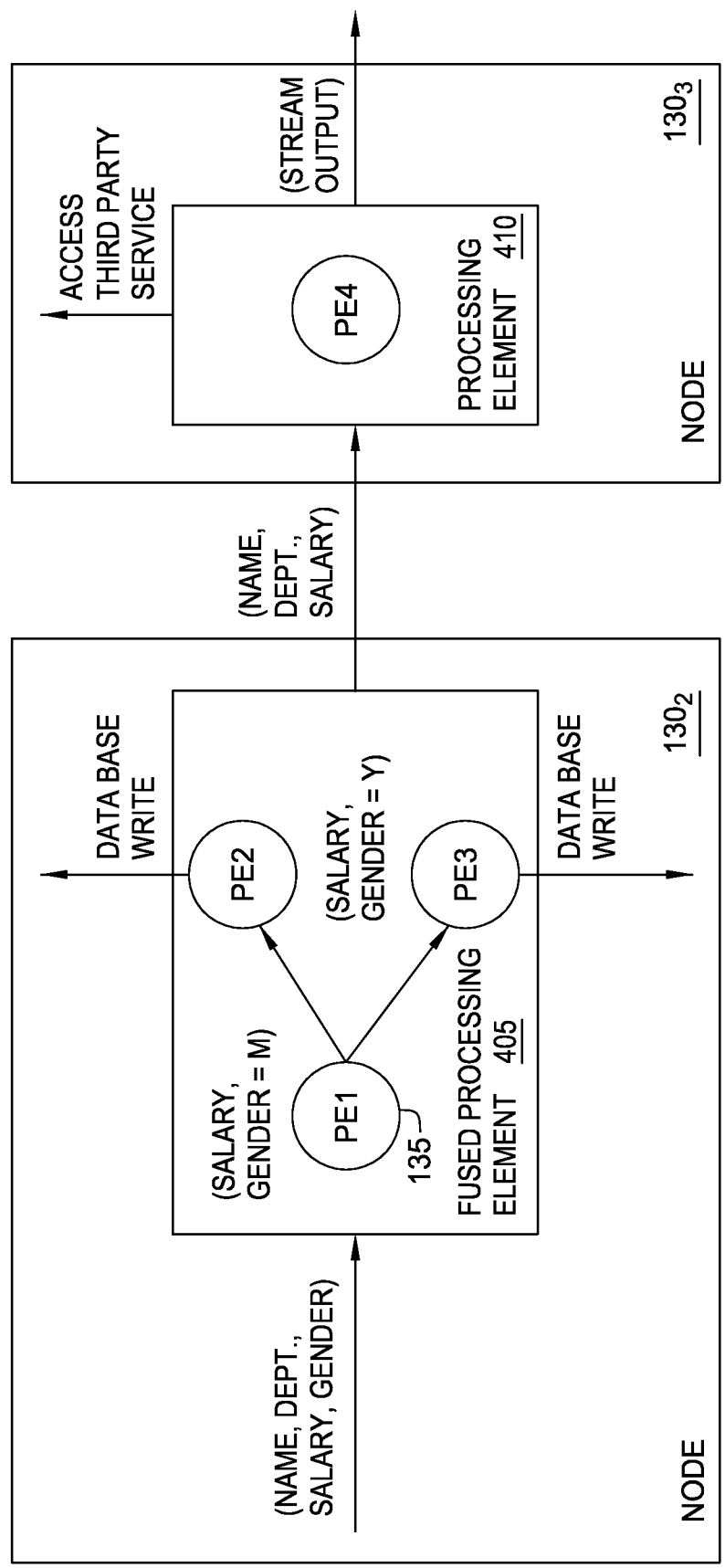
FIG. 4 illustrates an example of compute nodes in a stream application, according to one embodiment of the present invention.

FIG. 4 illustrates an example of compute nodes in a stream application, according to one embodiment of the invention. As shown, a processing element 405 on compute node 130₂ includes three processing elements (labeled PE1-

PE3), which receives an N-tuple data stream and emits an N-tuple to a processing element 410 (labeled PE4) on compute node 130₃. In this example, the processing element 405 includes source PE 135 (labeled PE1), which receives a tuple which includes <name, department, salary, gender>. PE1 takes this N-tuple and generates one set of tuples sent to PE2 and another set of tuples sent to PE3, based on the gender value in a tuple received by PE1. In turn, PE2 and PE3 perform a database write for each tuple received from PE1 and generate a tuple of <name, department, salary> sent to PE4. Once received, PE4 accesses a third-party web service and generates a tuple sent further downstream in the stream application.

Figure 5:
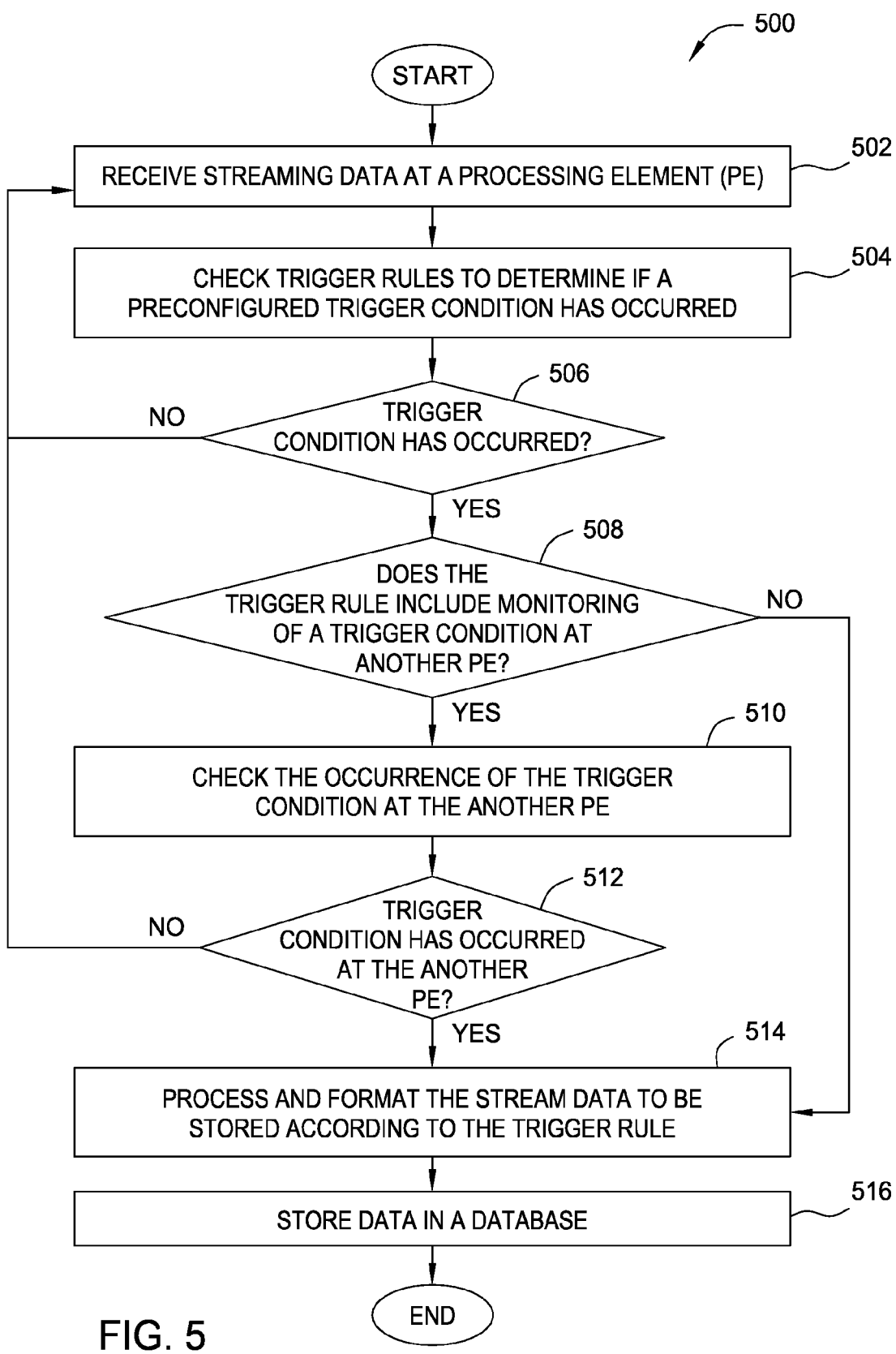
FIG. 5 illustrates a flow diagram of method steps for storing stream data based on predefined rules, according to one embodiment of the present invention.

FIG. 5 illustrates a method 500 for storing stream data based on the occurrences of preconfigured trigger rules, according to one or more embodiments of the present invention. The method 500 begins at step 502, where streaming data is received at a processing element (PE). At step 504, the trigger rules 270 are checked to determine if a pre-configured trigger condition has occurred. At decision step 506, a determination is made if a trigger condition has occurred, according to the configured trigger rule. If no, then the control goes back to step 502 to repeat the method 500 for the next set of data tuples. If yes, the control moves to decision step 508, where a determination is made if the trigger rule also includes monitoring the occurrence of a pre-defined event at another PE. If no, then at step 514, incoming data tuples are processed and formatted according to the trigger rule for storing in the database 110. In one embodiment, the processing element where the trigger condition has occurred may process, format and directly stores the data in the database system 110 according to the trigger rule configuration. In other embodiments, the data to be saved in the database system 110 is sent to the management system 105 for storing the data in the database system 110. In another embodiment, the data to be saved may be sent to another application for further processing either directly from the processing element or via the management system 105. However, if the answer is yes at decision step 508, then at step 510, the occurrence of a trigger condition is checked at the other PE. At decision step 512, a determination is made if the trigger condition has occurred at another PE. If no, then the control goes back to step 502. If yes, then control moves to step 514, where incoming data tuples are processed and formatted according to the trigger rule for storing in the database 110. At step 516, a selected slice of data in incoming data tuples, according to the trigger rule, is stored in the database system 110. As noted above, in one embodiment, the compute node of the PE where the trigger event occurred stores the streaming data through the database module 250. In another embodiment, the management server 105 collects the data from PEs and stores the collected data in the database system 110. However, since the trigger rules are configurable, other data storage mechanisms may be configured to be employed based on specific requirements of the stream application in question. In one embodiment, attributes of the streaming data are directly mapped to a particular table in the database system 110. In another embodiment, these attributes may be stored in multiple tables in the database system 110.

The following example illustrates a trigger rule scenario involving one process element (as presented in the method 500). As noted above, in an exemplary traffic monitoring application, a processing element may be configured to read the attribute named "license plate" in incoming data tuples. The processing element may further be configured to read another attribute named "Fastrack verified" from the data tuples. If the processing element determines that the vehicle as identified by the value of the "license plate" attribute did not verify its "Fastrack" credentials, the processing element may either store the license plate number in the database or emit another data tuple to be processed by another processing element, which in turn would store the license plate number. This stored data then may be used by another application for further processing with regards to accessing fines.

Further, the following example illustrates another use case of the method 500. In the above exemplary traffic monitoring application, assuming all three south bound traffic lanes of a highway are being monitored, where each lane is being monitored by a different processing element. Here, a composite trigger rule may be put in place in the three process elements wherein if the tuple flow goes below a selected threshold in all three process elements simultaneously, the trigger rule sets off to store a database entry to indicate that the southbound traffic is experiencing traffic flow issues. However, this same trigger rule would not be triggered if one process element is reporting a slow tuple rate but the remaining two process elements are still receiving tuples well above the selected threshold (indicating that even though one lane is experiencing slow traffic, the issue is limited to that particular lane itself). It is evident from the above examples a combination of processing elements and trigger rules can be used flexibly to implement a broad range of stream processing functionalities.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:
1. A method, comprising:
receiving a data stream to be processed in a data streaming environment comprising a plurality of processing elements interconnected by an operator graph, and wherein each of the processing elements is configured to receive an incoming tuple and perform a respective one or more processing operations on the incoming tuple, and wherein at least one of the plurality of processing elements is configured to generate, as a result of the respective one or more processing operations, an output tuple and to transmit the output tuple, based on the operator graph, to at least one downstream processing element in the plurality of processing elements;

loading a trigger rule on both a first processing element and a second processing element in the plurality of processing elements, wherein the trigger rule includes a trigger condition and defines a processing action to be performed upon satisfaction of the trigger condition on both the first processing element and the second processing element;

upon determining that a first tuple received at the first processing element satisfies the trigger condition and that a second tuple received at the second processing element satisfies the trigger condition, performing the processing action defined by the trigger rule on at least one of the first tuple, the second tuple and information related to the data stream;

storing at least one of information related to the data stream at the time the trigger condition was satisfied and the first tuple in a database, wherein the storing includes formatting the at least one of the information related to the data stream and the first tuple according to a predefined format in the trigger rule;

wherein the plurality of processing elements are communicatively coupled to a management system configured to monitor and control operations of the plurality of processing elements, wherein the management system is further configured to monitor a database to detect occurrences of a pre-defined event defined by a second trigger rule, and to perform a second processing action defined by the second trigger rule upon detecting an occurrence of the pre-defined event.

2. The method of claim 1, wherein the processing action includes sending the at least one of the information related to the data stream and the first tuple to an application that is external to the data streaming environment.

3. The method of claim 1, wherein the processing action includes sending the at least one of the information related to the data stream and the first tuple to a selected processing element in the plurality of processing elements.

4. The method of claim 1, wherein the trigger condition is satisfied when an incoming tuple rate at the first processing element exceeds a selected threshold value.

5. The method of claim 1, wherein the trigger condition is satisfied when an incoming tuple rate at the first processing element falls below a selected threshold value.

6. The method of claim 1, further comprising:
wherein the performing the processing action is performed only when the trigger condition is satisfied on the first processing element and the second processing element within a pre-configured window of time.

7. The method of claim 1, wherein the first processing element buffers the first tuple with other tuples received from the data stream, and wherein the processing action specifies to write one or more attributes related to the buffered tuples to a database.

8. The method of claim 1, wherein the trigger condition is satisfied when one of a period of time, a tuple rate, an attribute count, and an attribute deviation exceeds a pre-defined threshold on both the first processing element and the second processing element.

9. A non-transitory computer readable device containing a program which, when executed, performs an operation comprising:
receiving a data stream to be processed in a data streaming environment comprising a plurality of processing elements interconnected by an operator graph, and wherein each of the processing elements is configured to receive an incoming tuple and perform a respective one or more processing operations on the incoming tuple, and wherein at least one of the plurality of processing elements is configured to generate, as a result of the respective one or more processing operations, an output tuple and to transmit the output tuple, based on the operator graph, to at least one downstream processing element in the plurality of processing elements;

loading a trigger rule on both a first processing element and a second processing element in the plurality of processing elements, wherein the trigger rule includes a trigger condition and defines a processing action to be performed upon satisfaction of the trigger condition on both the first processing element and the second processing element;

upon determining that a first tuple received at the first processing element satisfies the trigger condition and that a second tuple received at the second processing element satisfies the trigger condition, performing the processing action defined by the trigger rule on at least one of the first tuple, the second tuple and information related to the data stream;

storing at least one of information related to the data stream at the time the trigger condition was satisfied and the first tuple in a database, wherein the storing includes formatting the at least one of the information related to the data stream and the first tuple according to a predefined format in the trigger rule;

wherein the plurality of processing elements are communicatively coupled to a management system configured to monitor and control operations of the plurality of processing elements, wherein the management system is further configured to monitor a database to detect occurrences of a pre-defined event defined by a second trigger rule, and to perform a second processing action defined by the second trigger rule upon detecting an occurrence of the pre-defined event.

10. The non-transitory computer readable device of claim 1, wherein performing the processing action defined by the trigger rule includes formatting the at least one of the information related to the data stream and the first tuple according to a predefined format in the trigger rule.

11. The non-transitory computer readable device of claim 9, wherein the processing action includes sending the at least one of the information related to the data stream and the first tuple to an application that is external to the data streaming environment.

12. The non-transitory computer readable device of claim 9, wherein the processing action includes sending the at least one of the information related to the data stream and the first tuple to a selected processing element in the plurality of processing elements.

13. The non-transitory computer readable device of claim 9, wherein the trigger condition is satisfied when an incoming tuple rate at the first processing element exceeds a selected threshold value.

14. The non-transitory computer readable device of claim 9, wherein the trigger condition is satisfied when an incoming tuple rate at the first processing element falls below a selected threshold value.

15. The non-transitory computer readable device of claim 9, wherein the operation further comprising:
wherein the performing the processing action is performed only when the trigger condition is satisfied on the first processing element and the second processing element within a pre-configured window of time.

16. The non-transitory computer readable device of claim 9, wherein the wherein the trigger condition is satisfied when one of a period of time, a tuple rate, an attribute count, and an attribute deviation exceeds a predefined threshold on both the first processing element and the second processing element.

17. A system, comprising:
a plurality of computer nodes, each including a processor and a memory, wherein each of the plurality of compute nodes is configured to execute one or more processing elements each comprising one or more operators;
a management system including at least a processor and a memory, wherein the management system and the compute nodes perform an operation comprising:
receiving a data stream to be processed in a data streaming environment comprising a plurality of processing elements interconnected by an operator graph, and wherein each of the processing elements is configured to receive an incoming tuple and perform a respective one or more processing operations on the incoming tuple, and wherein at least one of the plurality of processing elements is configured to generate, as a result of the respective one or more processing operations, an output tuple and to transmit the output tuple, based on the operator graph, to at least one downstream processing element in the plurality of processing elements;
loading a trigger rule on both a first processing element and a second processing element in the plurality of processing elements, wherein the trigger rule includes a trigger condition and defines a processing action to be performed upon satisfaction of the trigger condition on both the first processing element and the second processing element;
upon determining that a first tuple received at the first processing element satisfies the trigger condition and that a second tuple received at the second processing element satisfies the trigger condition, performing the processing action defined by the trigger rule on at least one of the first tuple, the second tuple and information related to the data stream;
storing at least one of information related to the data stream at the time the trigger condition was satisfied and the first tuple in a database, wherein the storing includes formatting the at least one of the information related to the data stream and the first tuple according to a predefined format in the trigger rule;
wherein the plurality of processing elements are communicatively coupled to a management system configured to monitor and control operations of the plurality of processing elements, wherein the management system is further configured to monitor a database to detect occurrences of a pre-defined event defined by a second trigger rule, and to perform a second processing action defined by the second trigger rule upon detecting an occurrence of the pre-defined event.

18. The system of claim 17, wherein performing the processing action defined by the trigger rule includes formatting the at least one of the information related to the data stream and the first tuple according to a predefined format in the trigger rule.

19. The system of claim 17, wherein the processing action includes sending the at least one of the information related to the data stream and the first tuple to an application that is external to the data streaming environment.

20. The system of claim 17, wherein the processing action includes sending the at least one of the information related to the data stream and the first tuple to a selected processing element in the plurality of processing elements.

21. The system of claim 17, wherein the trigger condition is satisfied when an incoming tuple rate at the first processing element exceeds a selected threshold value.

22. The system of claim 17, wherein the trigger condition is satisfied when an incoming tuple rate at the first processing element falls below a selected threshold value.

23. The system of claim 17, wherein the operation further comprising:
wherein the performing the processing action is performed only when the trigger condition is satisfied on the first processing element and the second processing element within a pre-configured window of time.

24. The system of claim 17, wherein the trigger condition is satisfied when one of a period of time, a tuple rate, an attribute count, and an attribute deviation exceeds a predefined threshold on both the first processing element and the second processing element.

25. The method of claim 1, wherein the plurality of processing elements execute on a plurality of compute nodes, wherein each of the plurality of compute nodes hosts one or more of the plurality of processing elements.

* * * * *